United States Patent

Ohata et al.

Patent Number: 5,485,826
Date of Patent: Jan. 23, 1996

[54] AIR-FUEL RATIO CONTROL DEVICE FOR INTERNAL COMBUSTION ENGINE

[75] Inventors: Akira Ohata, Mishima; Hiroshi Sawada, Gotenba, both of Japan

[73] Assignee: Toyota Jidosha Kabushiki Kaisha, Aichi, Japan

[21] Appl. No.: 217,109

[22] Filed: Mar. 24, 1994

[30] Foreign Application Priority Data

Mar. 26, 1993 [JP] Japan ............................ 5-068391

[51] Int. Cl.⁶ ........................................... F02D 41/14
[52] U.S. Cl. ............................. 123/679; 123/494
[58] Field of Search .......................... 123/492, 672, 123/679, 682, 694, 494

[56] References Cited

U.S. PATENT DOCUMENTS

| | | | |
|---|---|---|---|
| 4,974,563 | 12/1990 | Ikeda et al. | 123/492 X |
| 4,987,888 | 1/1991 | Funabashi et al. | 123/492 X |
| 5,190,020 | 3/1993 | Cho | 123/684 |
| 5,207,056 | 5/1993 | Benninger | 60/274 |
| 5,329,914 | 7/1994 | Togai et al. | 123/688 |
| 5,363,648 | 11/1994 | Akazaki et al. | 123/703 X |

FOREIGN PATENT DOCUMENTS 62-210234   9/1987   Japan .

Primary Examiner—Tony M. Argenbright
Attorney, Agent, or Firm—Oliff & Berridge

[57] ABSTRACT

An air-fuel ratio control device for an internal combustion engine having an intake passage and an exhaust passage with a three way catalytic converter. The device comprises a fuel injector for injecting fuel and an air-fuel ratio detector for detecting an air-fuel ratio in the engine cylinder, which is arranged in the exhaust passage upstream of the three way catalytic converter. A first estimation device estimates an amount of intake air actually fed into the engine cylinder. A first decision device decides a target amount of fuel which must be fed into the engine cylinder to realize the stoichiometric air-fuel ratio, on the basis of the amount of intake air estimated by the first estimation device. A second estimation device estimates an amount of fuel actually fed into the engine cylinder, on the basis of the air-fuel ratio detected by the air-fuel ratio detector, and the amount of intake air estimated by the first estimation device. A second decision device decides an amount of fuel actually injected by the fuel injector such that a difference between the amount of fuel estimated by the second estimation device and the target amount of fuel decided by the first decision device, and a time integration value of the difference are made to converge to "0" at the same time.

7 Claims, 4 Drawing Sheets

AIR-FUEL RATIO CONTROL DEVICE FOR INTERNAL COMBUSTION ENGINE

BACKGROUND OF THE INVENTION

1. Field of the Invention

The present invention relates to an air-fuel ratio control device for an internal combustion engine having a three-way catalytic converter in an exhaust system thereof.

2. Description of the Related Art

An exhaust system of an internal combustion engine is usually provided with a catalytic converter for converting harmful materials in exhaust gas into harmless materials. A three-way catalyst is generally used as the catalyst, and the three-way catalyst oxidizes CO and HC, and deoxidizes NO, so that these three harmful materials in exhaust gas are converted into $CO_3$, $H_2O$, and $N_2$, which are harmless materials. Such a purifying ability of the three-way catalyst depends on an air-fuel ratio of the mixture in an engine cylinder, and it is known that when the air-fuel ratio is stoichiometric, the three-way catalyst can purify all of these three harmful materials at the same time. Accordingly, in a conventional engine having the three-way catalytic converter, an air-fuel ratio detector for engine cylinder is arranged in the exhaust passage upstream of the catalytic converter. On the basis of output of the detector, when the air-fuel ratio of mixture becomes higher than the stoichiometric air-fuel ratio, i.e., when the mixture becomes lean, the amount of fuel fed into the engine is increased, and when the air-fuel ratio of mixture becomes lower than the stoichiometric air-fuel ratio, i.e., when the mixture becomes rich, the amount of fuel fed is reduced.

In such a conventional air-fuel ratio feedback control, during transient driving conditions, the air-fuel ratio of the mixture cannot always be made the stoichiometric air-fuel ratio. For example, in an acceleration driving condition, the amount of intake air increases suddenly so that the mixture is temporarily maintained on the lean side, and in a deceleration driving condition, conversely, the mixture is temporarily maintained on the rich side. However, it is known that the three-way catalyst has an $O_2$ storage function such that is absorbs and stores excess oxygen existing in the exhaust gas when the mixture is on the lean side, and it releases oxygen when the mixture is on the rich side, whereby, the three-way catalyst has a relatively high purifying ability even during these transient driving conditions.

Note, there is a limit to the amount of oxygen which can be stored in the three-way catalyst, so that, to utilize the above $O_2$ storage function effectively in case of next acceleration or deceleration, it is preferable that the three-way catalyst always stores a predetermined amount of oxygen. Japanese Unexamined Patent Publication No. 3-217633 discloses an air-fuel ratio control device for this purpose. In this device, the output varying against time (it is "0" when the mixture is stoichiometric) from the above air-fuel ratio detector is integrated, and the integrated value is used as the amount of oxygen stored in the three-way catalyst, and the air-fuel ratio control is carried out so as to maintain the integrated value constant.

However, the above integrated value cannot correctly represent the amount of oxygen stored, because the amount of exhaust gas varies every moment particularly during transient driving conditions. Accordingly, in the above device, the amount of oxygen stored in the three-way catalyst cannot be maintained on a predetermined amount. Moreover, the above air-fuel ratio control taking account of only the amount of oxygen stored in the catalyst, requires a relatively long time for the air-fuel ratio of the mixture to converge to the stoichiometric air-fuel ratio. This is undesirable in the engine.

SUMMARY OF THE INVENTION

Therefore, an object of the present invention is to provide an air-fuel ratio control device capable of accurately maintaining the amount of oxygen stored in the three-way catalyst at a predetermined amount, and of converging an air-fuel ratio to the stoichiometric air-fuel ratio in a relatively short time.

According to the present invention, there is provided an air-fuel ratio control device for an internal combustion engine having an intake passage and an exhaust passage with a three-way catalytic converter, comprising: a fuel injector for injecting fuel; an air-fuel ratio detector, for detecting an air-fuel ratio in the engine cylinder, which is arranged in the exhaust passage upstream of the three-way catalytic converter; first estimation means for estimating an amount of intake air actually fed into the engine cylinder; first decision means for deciding a target amount of fuel which must be fed into the engine cylinder to realize the stoichiometric air-fuel ratio, on the basis of the amount of intake air estimated by the first estimation means; second estimation means for estimating an amount of fuel actually fed into the engine cylinder, on the basis of the air-fuel ratio detected by the air-fuel ratio detector, and the amount of intake air estimated by the first estimation means; and second decision means for deciding an amount of fuel actually injected by said fuel injector such that a difference between the amount of fuel estimated by the second estimation means and the target amount of fuel decided by the first decision means, and a time integration value of said difference are made to converge into "0" at the same time.

The present invention will be more fully understood from the description of preferred embodiments of the invention set forth below, together with the accompanying drawings.

DESCRIPTION OF THE PREFERRED EMBODIMENTS

Figure 1:
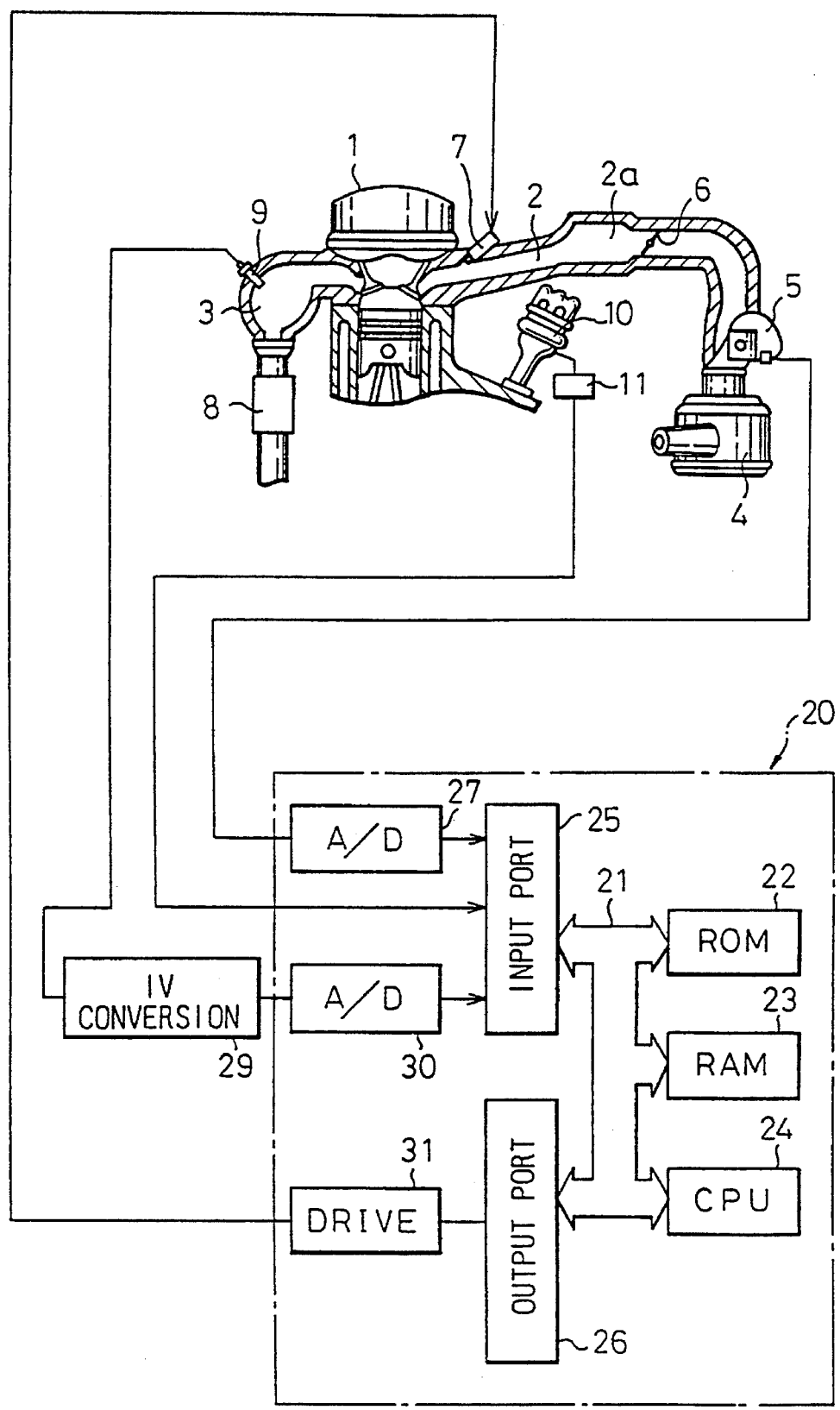
FIG. 1 is a general view of an engine.

Referring to FIG. 1, reference numeral 1 designates an engine body, 2 an intake passage, 3 an exhaust passage. The intake passage 2 is connected to an air cleaner 4 on upstream end. An air flow meter 5 is arranged in the intake passage 2 directly downstream of the air cleaner 4. A throttle valve 6 is arranged in the intake passage 2 upstream of a surge tank 2a, and each fuel injector 7 is arranged downstream thereof for every engine cylinder. A three-way catalytic converter 8 for purifying exhaust gas is arranged in the exhaust passage 3, and an air-fuel ratio sensor 9 is arranged therein upstream of the three-way catalytic converter 8. A distributor 10 is provided with a crank angle sensor 11.

Reference numeral 20 designates an electronic control unit (ECU) for controlling an amount of fuel injected by the fuel injector 7. The ECU 20 is constructed as a digital computer and includes a ROM (read only memory) 22, a RAM (random access memory) 23, a CPU (microprocessor, etc.) 24, an input port 25, and an output port 26, which are interconnected by a bidirectional bus 21. The air flow meter 5 produces an output voltage which is proportional to the amount of air fed into the engine cylinder, and this output voltage is input into the input port 25 via an AD converter 27. The crank angle sensor 11, which produces an output pulse representing the engine speed, is connected to the input port 25. The air-fuel ratio sensor 9 is connected to the output port 25 via a current-voltage converter circuit 29 and an AD converter 30. The output port 26 is connected to each fuel injector 7 via a drive circuit 31.

Figure 2A:
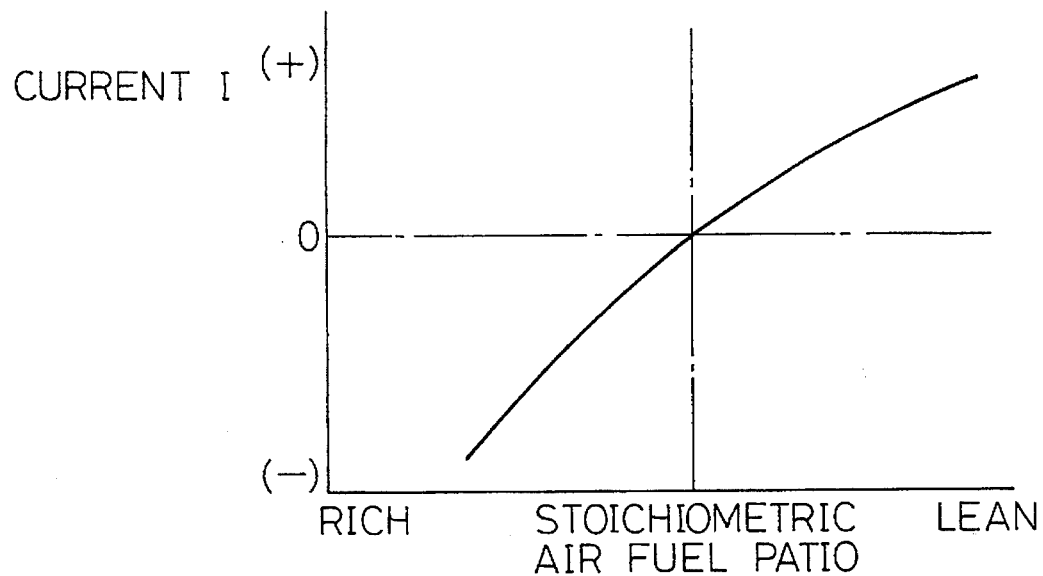
FIG. 2A is a diagram illustrating the output current of the air-fuel ratio sensor.
Figure 2B:
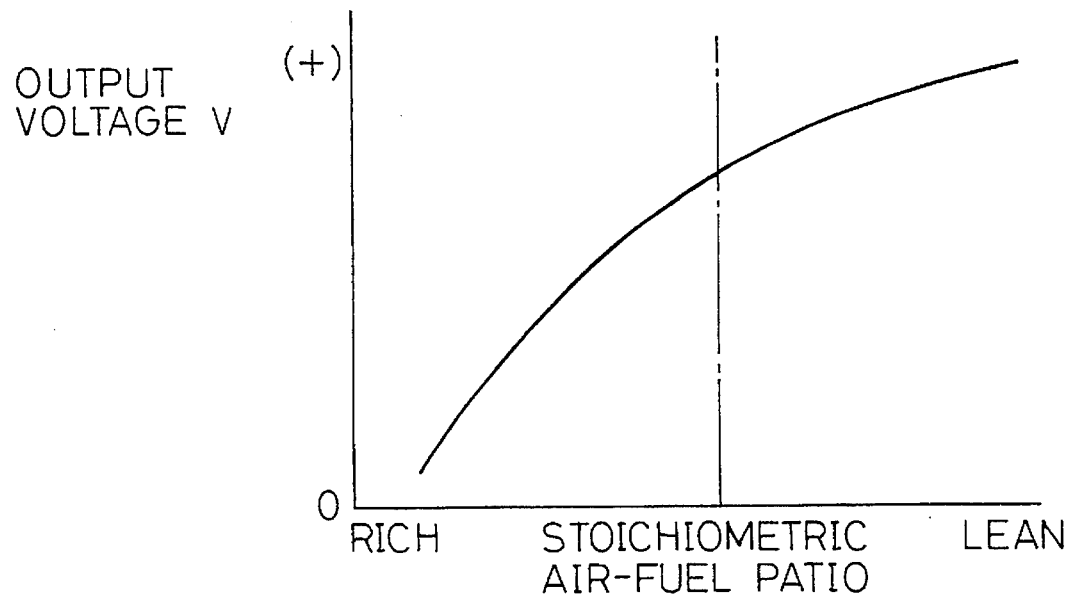
FIG. 2B is a diagram illustrating the output voltage of the air-fuel ratio sensor.

The air-fuel ratio sensor 9 has a construction such that the anode is formed on the inner face of the tubular member made of, for example, zirconia, and the cathode is formed on the outer face of the tubular member, and that the out face of the cathode is covered by a porous layer, and a current [I] which varies in accordance with a change in the air-fuel ratio as illustrated in FIG. 2A flows between the anode and the cathode of the air-fuel ratio sensor 9. This current [I] is converted to a corresponding voltage in the current-voltage converting circuit 29, and an output voltage V which varies in accordance with a change in the air-fuel ratio as illustrated in FIG. 2B is produced at the output terminals of the current-voltage converting circuit 29. Accordingly, the air-fuel ratio can be indicated by the output voltage [V] of the current-voltage converting circuit 29.

Figure 3:
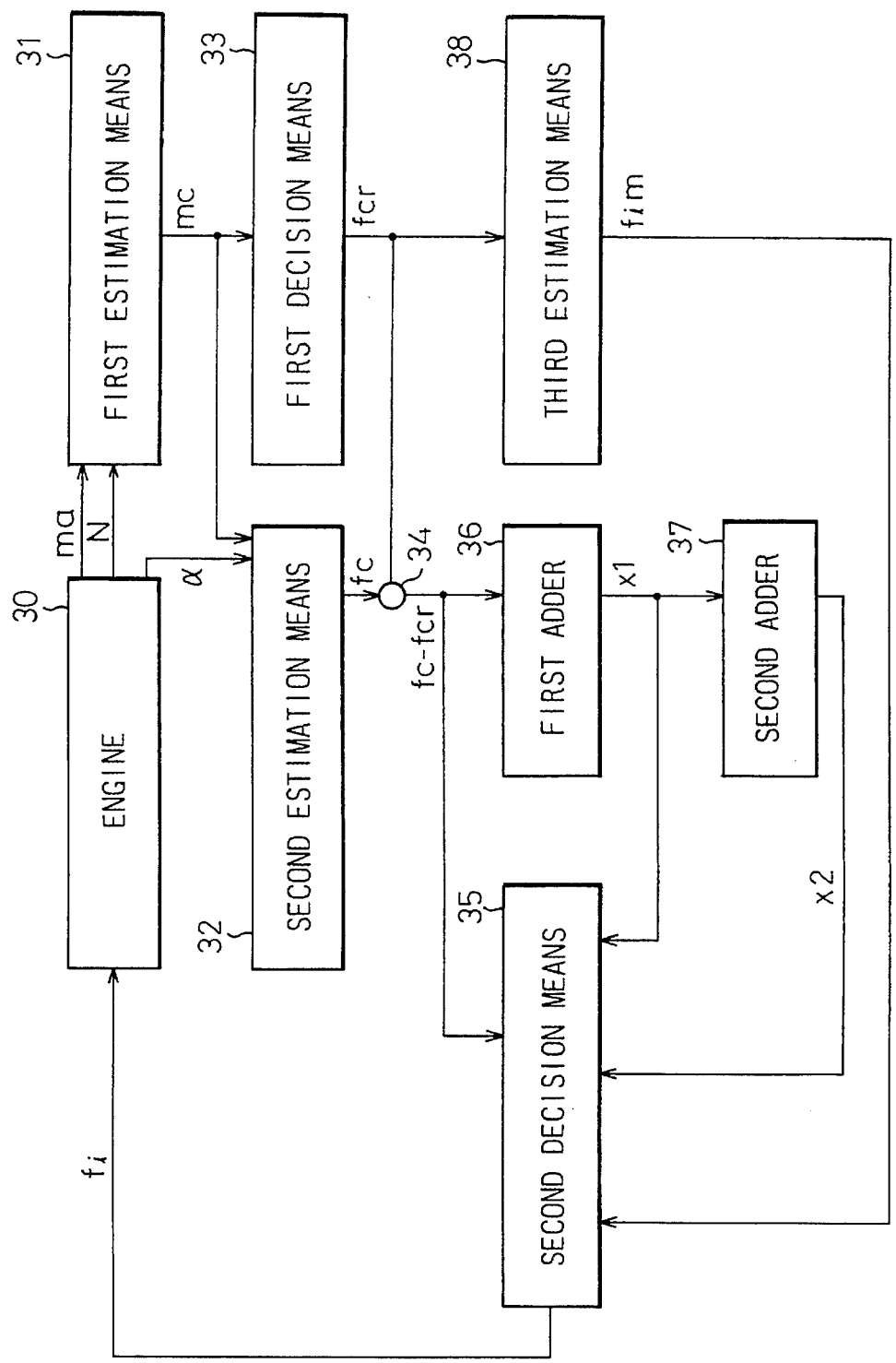
FIG. 3 is a block diagram showing air-fuel control according to the present invention.

FIG. 3 is a block diagram showing air-fuel ratio control by the ECU 20. In FIG. 3, reference numeral 30 designates the above engine body, and 31 designates a first estimation means for estimating a current amount of intake air [mc] actually fed into the engine cylinder by means of a map (not shown), on the basis of a current amount of intake air [ma] detected by the air flow meter 7 and a current engine speed [N] detected by the crank angle sensor 11.

Reference numeral 32 designates a second estimation means for estimating an amount of fuel [fc] actually fed into the engine cylinder by dividing the amount of intake air [mc] estimated by the first estimation means 31 by an air-fuel ratio [α] of the mixture detected by the air-fuel ratio sensor 9. Reference numeral 33 designates first decision means for deciding a target amount of fuel [fcr] which must be fed into the engine cylinder to realize the stoichiometric air-fuel ratio, by dividing the amount of intake air [mc] estimated by the first estimation means 31 by the stoichiometric air-fuel ratio [αr].

The amount of fuel [fc] and the target amount of fuel [fcr] are inputed to a subtraction device 34, and a difference [fc-fcr] is calculated therein. Next, the difference [fc-fcr] is outputed to a second decision means 35 for deciding the amount of fuel [fi] actually injected by the fuel injector 7, and to a first adder 36. The difference [fc-fc4] is integrated in the first adder 36, and the integration value [x1] as the result is outputed to the second decision means 35. In the second decision means 35, an amount of fuel [fi] injected actually is calculated such that the difference [fc-fcr] and the integrated value [x1] is made to converge to "0" at the same time.

When the above integration value [x1] is "0", the amount of oxygen stored in the three-way catalytic converter 8 equals an initial amount of oxygen stored. When the mixture is lean so that a difference [fc-fcr] become a negative quantity, the difference [fc-fcr] multiplied by a brief moment of time [Δt] can be equivalent to an additional amount of oxygen stored in the three-way catalytic converter 8, and when the mixture is rich so that a difference [fc-fcr] becomes a positive quantity, the difference [fc-fcr] multiplied by a brief moment of time [Δt] can be equivalent to an amount of oxygen released from the three-way catalytic converter 8.

Accordingly, if an amount of fuel [fi] actually injected is calculated such that the difference [fc-fcr] and the integration value [x1] is made "0" at the same time, when the mixture becomes rich or lean during transient driving conditions, the amount of oxygen stored in the three-way catalyst converter 8 and an air-fuel ratio of the mixture can be respectively converged to a predetermined amount and the stoichiometric air-fuel ratio in a relatively short time.

In order that the determination of the amount of fuel [fi] actually injected is made more precisely in the second decision means 35, the integration value [x1] is further integrated in a second adder 37, and the second order integration value [x2] as the result is outputted to the second decision means 35. There is no problem in the case that all of an amount of fuel injected is fed into the engine cylinder. However, in the present embodiment, fuel injected by the fuel injector 7 impinges on the inside wall of the intake passage 2 and part of the fuel sticks on the inside wall, so that the amount of fuel injected does not always equal the amount of fuel fed into the engine cylinder. Accordingly, the amount of fuel fed into the engine cylinder must be estimated on the basis of the amount of fuel injected. A third estimation means 38 for this purpose is provided and a basic amount of fuel [fim] which must be injected by the fuel injector 7 to realize the stoichiometric air-fuel ratio is calculated therein on the basic of a target amount of fuel [fcr], and the basic amount of fuel [fim] is outputed to the second decision means 35.

A concrete calculation method for deciding an amount of fuel [fi] actually injected is explained as follows.

In the present air-fuel ratio control, a fuel dynamics model which described the dynamics of fuel flowing into the engine cylinder is used. This is shown in expressions (1) and (2).

$$fw(k+1) = Pfw(k) + Rfi(k) \tag{1}$$

$$fc(k) = (1-P)fw(k) + (1-R)fi(k) \tag{2}$$

Where, [fi(k)] represents an amount of fuel actually injected by the fuel injector 7 at this time. [R] represents a ratio of the amount of fuel stuck on the inside wall of the intake passage 2 to all the fuel injected. [fw(k)] represents the total amount of fuel stuck on the inside wall at this time. [P] represents a ratio of the amount of fuel still not fed to the engine cylinder to the total amount of fuel stuck on the inside wall. Accordingly, [fw(k+1)] represents the total amount of fuel stuck on the inside wall at the next time, and [fc(k)] represents an amount of fuel actually fed to the engine cylinder at this time. [P] and [R] can be obtained by experiment. Here, for example, [P] and [R] are made constants.

Expression (3) shows a first order integration value [x1] of a difference [fc-fcr] between an amount of fuel [fc] actually fed to the engine cylinder and a target amount of fuel [fcr]. The first order integration value [x1] can be represented as expression (4).

$$x1 = \sum_{l=0}^{k} \{fc(i) - fcr(i)\} \quad (3)$$

$$x1(k+1) = x1(k) + \{fc(k) - fcr(k)\} \quad (4)$$

[fc(k)] is deleted by means of the expressions (2) and (4) so that expression (5) can be obtained.

$$x1(k+1)=x1(k)+(1-P)fw(k)+(1-R)fi(k)-fcr(k) \quad (5)$$

Next, an amount of fuel [fi(k)] actually injected, an amount of fuel [fw(k)] stuck on the inside wall, and an amount of fuel [fc(k)] actually fed into the engine cylinder are respectively represented by the sum of each nominal value (fim(k)], [fwm(k)], [fcm(k)] and each deviation ($\delta$ fi(k)], [$\delta$ fw(k)], [$\delta$ fc(k)] as shown in each expression (6), (7), (8). Here, each nominal value is set such that expressions (9), (10), (11) are produced.

$$fi(k)=fim(k)+\delta fi(k) \quad (6)$$

$$fw(k)=fwm(k)+\delta fw(k) \quad (7)$$

$$fc(k)=fcm(k)+\delta fc(k) \quad (8)$$

$$fcm(k)=(1-P)fwm(k)+(1-R)fim(k) \quad (9)$$

$$fwm(k+1)=Pfwm(k)+Rfim(k) \quad (10)$$

$$fcm(k)=fcr(k) \quad (11)$$

Expressions (12), (13), (14) can be obtained by substituting these expressions (6)–(11) for the expressions (4), (1), (2). Matrix expression (15) can be obtained by the expressions (12) and (13). Matrix expression (16) can be obtained by using "x1(i)=x1(k)" and the expression (14).

$$x1(k+1) = x1(k) + (1-P)\delta fw(k) + (1-R)\delta fi(k) \quad (12)$$

$$\delta fw(k+1) = P\delta fw(k) + R\delta fi(k) \quad (13)$$

$$\delta fc(k) = (1-P)\delta fw(k) + (1-R)\delta fi(k) \quad (14)$$

$$\begin{bmatrix} x1(k+1) \\ \delta fw(k+1) \end{bmatrix} = \begin{bmatrix} 1. & 1-P \\ 0. & P \end{bmatrix} \begin{bmatrix} x1(k) \\ \delta fw(k) \end{bmatrix} + \begin{bmatrix} 1-R \\ R \end{bmatrix} \delta fi(k) \quad (15)$$

$$\begin{bmatrix} x1(k) \\ \delta fc(k) \end{bmatrix} = \begin{bmatrix} 1. & 0 \\ 0. & 1-P \end{bmatrix} \begin{bmatrix} x1(k) \\ \delta fw(k) \end{bmatrix} + \begin{bmatrix} 0 \\ 1-R \end{bmatrix} \delta fi(k) \quad (16)$$

Next, the modern control theory which is disclosed, for example, in "Masatake Siraishi: An Introduction to Modern Control Theory, Keigaku Publishing Company, 1989" is used. The matrix expression (15) is a state equation as "X(k+1)=AX(k)+BU(k)", and the matrix expression (16) is an output equation as "Y(k)=CX(k)+DU(k)".

A performance index [J] against the above two equations is represented by a expression (17). In the expression (17), [Q] and [R are weighting matrixes "[Q]>=0" and "[R]>0". These matrixes are symmetrical each other. A minimization of the performance index [J] causes an optimal control such that consumption energy is made small and the transition characteristic is made good. An optimal feed back control input [$U^2$] is "$-R^{-1} B^-PX$". In the expression, [P] is given by solving the Riccati equation "$A^TP+PA+Q-PBR^{-1}B^TP=0$". Accordingly, a performance index [J] against the expressions (15) and (16) can be represented as a expression (18), so that an optimal feed back control input [$\delta$ fi(k)] can be represented by a expression (19) in which [f1] and [f2] are constants. If an amount of fuel injected is controlled according to the expression (19), the above purpose is accomplished. However, a deviation [$\delta$ fw(k)] of an amount of fuel [fw(k)] stuck on the side wall of the intake passage 2 cannot be measured and must be estimated by means of an observer.

$$J = \int_0^\infty [(X^TQX + U^TRU)]\, dt \quad (17)$$

$$J = \sum_{k=0}^{\infty} [q1 \times 1^2(K) + q2\delta fc^2(k) + r1fi^2(k)] \quad (18)$$

$$\delta fi(k) = f1 \times 1(k) + f2\delta fw(k). \quad (19)$$

An expression (20) is well known, as the observer against the expressions (15) and (16). Here, [a], [b], and [i] are constants. [$\delta$ fw] is deleted by means of the expressions (19) and (20) so that an expression (21) can be obtained.

$$\delta fw(k+1)=a\delta fw(k)+b\delta fc(k)+j\delta fi(k) \quad (20)$$

$$\delta fi(k)=[a+jf2]\delta fi(k-1)+(f1\times1(k)-af1\times1(k-1)+bf2\delta fc(k-1) \quad (21)$$

If an amount of fuel injected is controlled according to the expression (21), [x1] and [$\delta$ fc] should optimally converge to "0". However, there is a chance that the expression (10) is at variance with the real conditions. Accordingly, a servo control system is designed as expression (22), according to the Smith Devison method. Here, "$\Delta x1(k)=x1(k)-x1(k-1)$".

$$\begin{bmatrix} \Delta x1(k+1) \\ \Delta \delta fw(k+1) \\ x1(k) \end{bmatrix} = \begin{bmatrix} 1.1 - P.0 \\ 0.P.0 \\ 1.0.1 \end{bmatrix} \begin{bmatrix} \Delta x1(k) \\ \Delta \delta fw(k) \\ x1(k-1) \end{bmatrix} + \begin{bmatrix} 1-R \\ R \\ 0 \end{bmatrix} \Delta \delta fi(k) \quad (22)$$

A performance index can be obtained as same as the above. [$\Delta \delta$ fi(k)] which minimizes the performance index can be represented by expression (23) in which [f1'], [f2'], [f3'], and [f4'] are constants. Expression (24) can be obtained by the expression (23). Once [$\delta$ fw] is deleted by means of an observer as same as the above. Expression (25) can be obtained. In the expression (25), new constants [f1], [f2], [f3], [f4], [f5], [f6], and [f7] are used and an integration value of [x1] represents [x2], so that an expression (26) can be obtained. If [$\delta$ fi(k)] is decided by the expression (26), [x1] and [$\delta$ fc] can optimally converge to "0".

$$\Delta \delta fi(k) = f1'\Delta x1(k)+f2'\Delta \delta fw(k)+ f3'x1(k-1)+f4'\delta fc(k-1) \quad (23)$$

$$\delta fi(k) = f1'x1(k)+f2'\delta fw(k)+\sum_{t=0}^{K-1} f3'x1(i)+\sum_{t=0}^{K-1} f4'\delta fc(i) \quad (24)$$

$$\delta fi(k) = [a+f2'j]\delta fi(k-1)+f2'b\delta fc(k-1)+ f1'x1(k)+[-f1'a+f4']x1(k-1)- f4'ax1(k-2)+f3'\sum_{t=0}^{K-1} x1(i)- f3'\sum_{t=0}^{k-2} x1(i) \quad (25)$$

$$\delta fi(k) = f1\delta fi(k-1)+f2\delta fc(k-1)+ f3x1(k)+f4x1(k-1)+ f5x1(k-2)+f6x2(k-1)+ f7x2(k-2) \quad (26)$$

Figure 4:
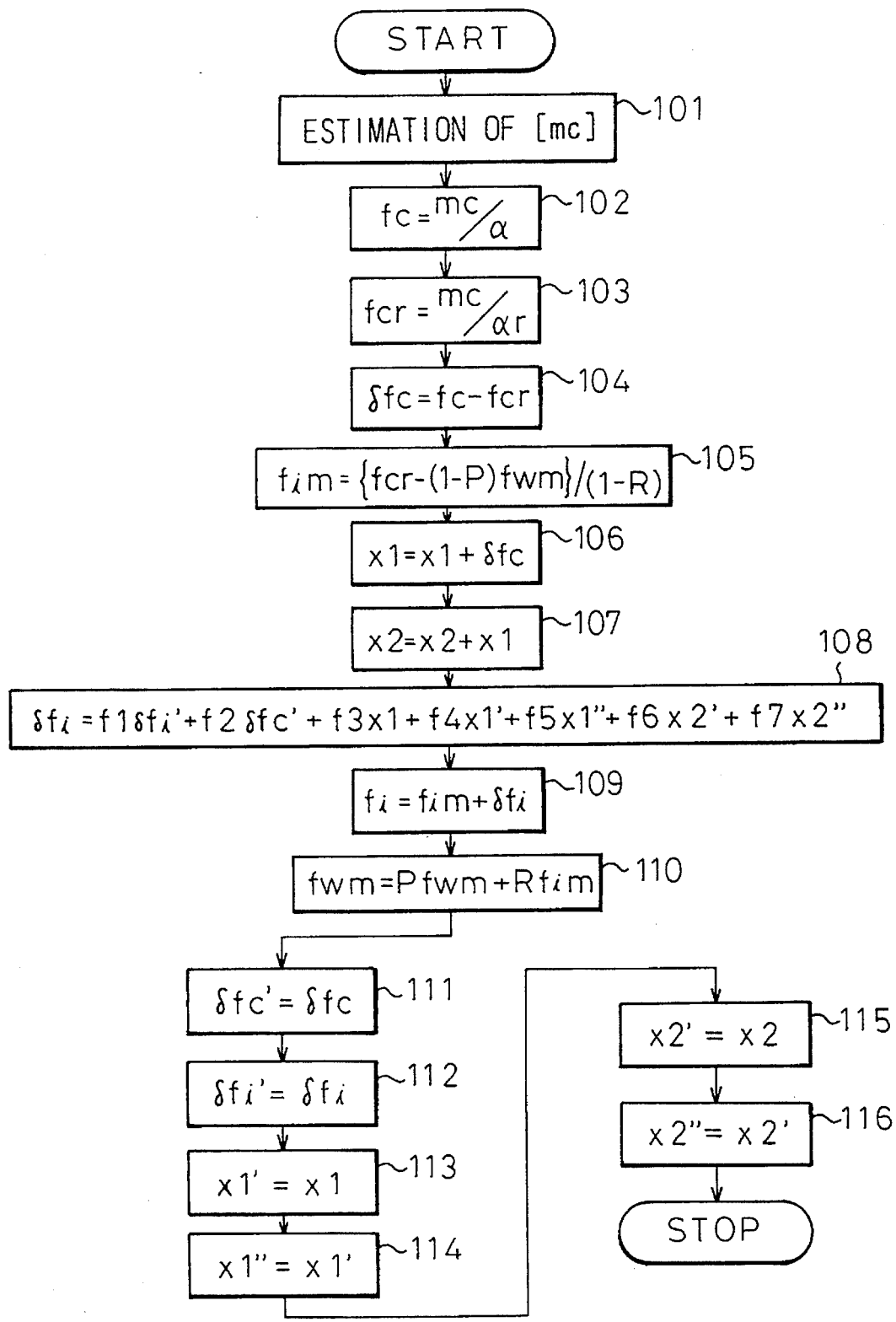
FIG. 4 is a flow chart for air-fuel control according to the present invention.

FIG. 4 shows a concrete flow chart according to this calculation method. In this flow chart, ['] shows a value at the last time and ["] shows a value previous to the last time. The flow chart starts at the same time as "ON" signal to a starter for the engine and repeats every predetermined time. [$\delta$ fc'], [fwm], [$\delta$ fi'], [x1], [x1'], [x1"], [x2], [x2'], and [x2"] are reset to "0" at the same time as the engine is stopped.

First, at step 101, the amount of intake air [mc] actually fed to the engine cylinder is estimated by the first estimation means 31. Next, at step 102, the amount of fuel [fc] actually fed into the engine cylinder is estimated by the second estimation means 32, and at step 103, the target amount of the fuel [fcr] which must be fed into the engine cylinder to realize the stoichiometric air-fuel ratio is calculated by the first decision means 33, on the basis of the amount of intake air [mc]. At step 104, the difference [δ fc] between the amount of fuel [fc] and the target amount of fuel [fcr] is calculated by the subtraction device 34. Next, at step 105, the basic amount of fuel [fim] had to be injected by the fuel injector 6 to realize the stoichiometric air-fuel ratio is calculated by the third estimation means 38. Here, [fim] is the above nominal value of an amount of fuel [fi] actually injected, and can be obtained by reforming the expressions (9) and (10) into the expression shown at step 105, on the basis of the target amount of fuel [fcr] and a nominal value [fwm] of an amount of fuel [fw] stuck on the inside wall of the intake passage 2, which [fwm] had been reset to "0" in first cycle.

Next, at step 106, a first order integration value [x1] of the difference [δ fc] calculated at step 104 is calculated in the first adder 36 and at step 107, a second order integration value [x2] of the difference [δ fc] is calculated in the second adder 37.

The following steps are carried out in the second decision means 35. At step 108, a compensation amount of fuel [δ fi] for the basic amount of fuel [fim] is calculated by means of the above expression (26). At step 109, the amount of fuel [fi] actually injected by the injector 7 can be obtained by adding the basic amount of fuel [fim] calculated at step 105 with the compensation amount of fuel [δ fi] so that fuel injection is carried out. In step 108, [δ fc'], [δ fi'], [x1'], [x1"], [x2'], and [x2"] had been reset to "0" in first cycle.

At step 110, a nominal value [fwm] of the amount of fuel [fw] stuck on the inside wall of the intake passage 2 is updated on the basis of the basic amount of fuel [fim] calculated at step 105. At step 111, the difference [δ fc] at this time is recorded as the difference [δ fc'] for next cycle. At step 112, the compensation amount of fuel [δ fi] at this time is recorded as the compensation amount of fuel [δ fi'] for next cycle. At step 113, the first order integration value [x1] at this time is recorded as the first order integration value [x1'] for next cycle. At step 114, the first order integration value [x1'] at last time is recorded as the first order integration value [x1"] for next cycle. At step 115, the second order integration value [x2] at this time is recorded as the second order integration value [x2'] for next cycle. At step 116, the second order integration value [x2'] at last time is recorded as the second order integration value [x2"] for next cycle. Thereafter, the routine is stopped.

Note, in this flow chart, the ratio [R] of an amount of fuel stuck on the inside wall of the intake passage 2 to all the fuel injected by the fuel injector 7, and the ratio [P] of an amount of fuel still not fed to the engine cylinder to the total amount of fuel stuck on the inside wall, are respectively made the constants in order to simplify the routine. However, in fact, both of these values are variables in accordance with engine driving conditions. Whereby, this air-fuel ratio control can be made more exact by varying these ratios [R] and [P] every cycle, in accordance with engine driving conditions, on the basis of maps (not shown) in which optimal ratios [R] and [P] are set for each engine driving condition.

According to the present invention, an amount of fuel actually injected by the fuel injector 7 is controlled such that the difference between an amount of fuel actually fed to the engine cylinder and an amount of fuel which must be fed to the engine cylinder to realize the stoichiometric air-fuel ratio, and a first order time integration value, are made to converge to "0". Whereby, if the mixture becomes lean or rich during transient driving conditions, the air-fuel ratio can be made to converge to the stoichiometric air-fuel ratio at the same time as the amount of oxygen stored in the three-way catalyst can be made to converge to the initial amount of oxygen that had been stored, in relatively short term. Accordingly, the three-way catalyst converter 8 always functions effectively and a good engine driving condition using a stoichiometric air-fuel mixture can be realized.

Although the invention has been described with reference to specific embodiments thereof, it should be apparent that numerous modifications can be made thereto by those skilled in the art, without departing from the basic concept and scope of the invention.

We claim:

1. An air-fuel ratio control device for an internal combustion engine having an intake passage and an exhaust passage with a three way catalytic converter, comprising:

a fuel injector for injecting fuel;

an air-fuel ratio detector for detecting an air-fuel ratio in the engine cylinder, which is arranged in said exhaust passage upstream of said three way catalytic converter;

first estimation means for estimating an amount of intake air actually fed into the engine cylinder;

first decision means for deciding a target amount of fuel which must be fed into the engine cylinder to realize the stoichiometric air-fuel ratio, on the basis of the amount of intake air estimated by said first estimation means;

second estimation means for estimating an amount of fuel actually fed into the engine cylinder, on the basis of the air-fuel ratio detected by said air-fuel ratio detector and the amount of intake air estimated by said first estimation means; and second decision means for deciding an amount of fuel actually injected by said fuel injector such that a difference between the amount of fuel estimated by said second estimation means and the target amount of fuel decided by said first decision means, and a time integration value of said difference are made to converge to "0" at the same time.

2. A device according to claim 1, wherein said fuel injector injects fuel into said intake passage so that a part of fuel injected by said fuel injector sticks on the inside wall of said intake passage, said device further comprising a third estimation means for estimating a basic amount of fuel to be injected by said fuel injector to realize the stoichiometric air-fuel ratio, on the basis of the target amount of fuel decided by said first decision means, said second decision means using said basic amount of fuel to decide an amount of fuel actually injected by said fuel injector.

3. A device according to claim 2, wherein said third estimation means estimates said basic amount of fuel according to the fuel dynamic model shown by the following expressions:

$$fw(k+1) = Pfw(k) + Rfi(k)$$

$$fe^*(k) = (1-P)fw(k) + (1-R)fi(k)$$

where, [fi] represents an amount of fuel actually injected by said fuel injector, [R] represents a ratio of an amount of fuel stuck on the inside wall of said intake passage to all the fuel actually injected, [fw] represents the total amount of fuel stuck on the inside wall, [P] represents a ratio of an amount of fuel still not fed to the engine cylinder to the total amount of fuel stuck on the inside wall, and [fc] represents an amount of fuel actually fed to the engine cylinder.

4. A device according to claim 3, wherein said ratios [P] and [R] are made constants.

5. A device according to claim 3, wherein said amount of fuel [fi] actually injected by said fuel injector, said total amount of fuel [fw] stuck on the inside wall, and said amount of fuel [fc] actually fed to the engine cylinder are respectively represented by the sum of each nominal value [fim], [fwm], [fcm] and each deviation [δ fi], [δ fw], [δ fc], said nominal value [fim] of the amount of fuel [fi] actually injected by said fuel injector is made said basic amount of fuel which must be injected by said fuel injector to realize the stoichiometric air-fuel ratio estimated by said third estimation means, said second decision means deciding an amount of fuel injected by said fuel injector.

6. A device according to claim 5, wherein said deviation [δ fw] of the total amount of fuel [fw] stuck on the inside wall is determined by means of an observer as follows:

$$\delta fw(k+1) = a fw(:k) + b\delta ic(k) + j\delta i(k)$$

where, [a], [b], and [j] are constants are fw(k) is the amount of fuel [fw] stuck on the inside wall at time k and fw(k+1) represents the amount of fuel [fw] stuck on the inside wall at time (k+1).

7. A device according to claim 6 wherein in said second decision means, a servo control system is designed as follows:

$$\begin{bmatrix} \Delta x1(k+1) \\ \Delta \delta fw(k+1) \\ x1(k) \end{bmatrix} = \begin{bmatrix} 1.1 - P.0 \\ 0.P.0 \\ 1.0.1 \end{bmatrix} \begin{bmatrix} \Delta x1(k) \\ \Delta \delta fw(k) \\ x1(k-1) \end{bmatrix} + \begin{bmatrix} 1-R \\ R \\ 0 \end{bmatrix} \Delta \delta fw(k)$$

where, $\Delta x1(k) = x1(k) - s1(k-1)$ and x1 is an integration value of the amount of fuel actually injected.

* * * * *